United States Patent
Chen et al.

(10) Patent No.: US 9,013,398 B2
(45) Date of Patent: Apr. 21, 2015

(54) CONTROL METHODS FOR A MULTI-FUNCTION CONTROLLER

(75) Inventors: Shu-Jen Chen, Hsinchu (TW); Chang Ou Yang, Tainan (TW)

(73) Assignee: Elan Microelectronics Corporation, Hsinchu (TW)

( * ) Notice: Subject to any disclaimer, the term of this patent is extended or adjusted under 35 U.S.C. 154(b) by 853 days.

(21) Appl. No.: 13/249,290

(22) Filed: Sep. 30, 2011

(65) Prior Publication Data

US 2012/0092330 A1  Apr. 19, 2012

Related U.S. Application Data

(60) Provisional application No. 61/394,423, filed on Oct. 19, 2010.

(30) Foreign Application Priority Data

Jul. 28, 2011 (TW) .............................. 100126849 A

(51) Int. Cl.
| | | |
|---|---|---|
| G06F 3/0485 | (2013.01) | |
| G06F 3/041 | (2006.01) | |
| G06F 3/0338 | (2013.01) | |
| G06F 3/0483 | (2013.01) | |
| G06F 3/0484 | (2013.01) | |
| A63F 13/20 | (2014.01) | |

(52) U.S. Cl.
CPC ............ G06F 3/0485 (2013.01); G06F 3/0414 (2013.01); G06F 3/0338 (2013.01); G06F 3/0483 (2013.01); G06F 3/04842 (2013.01); G06F 3/04847 (2013.01); G06F 2203/04806 (2013.01); A63F 13/06 (2013.01); A63F 2300/1018 (2013.01); A63F 2300/1043 (2013.01)

(58) Field of Classification Search
CPC ........ G06F 3/00–3/04897; G06F 2203/04806; A63F 13/06; A63F 2300/1018; A63F 2300/1043
USPC ...................... 345/156–184; 178/18.01–18.04
See application file for complete search history.

(56) References Cited

U.S. PATENT DOCUMENTS

| | | | | |
|---|---|---|---|---|
| 5,335,557 | A * | 8/1994 | Yasutake .................. | 73/862.043 |
| 5,995,083 | A * | 11/1999 | Sato et al. ..................... | 345/173 |
| 6,064,384 | A * | 5/2000 | Ho ................ | 715/839 |
| 6,407,757 | B1 * | 6/2002 | Ho ................ | 715/776 |
| 6,597,347 | B1 * | 7/2003 | Yasutake ....................... | 345/173 |

(Continued)

FOREIGN PATENT DOCUMENTS

| | | |
|---|---|---|
| CN | 1508660 A | 6/2004 |
| CN | 101174185 A | 5/2008 |

(Continued)

*Primary Examiner* — Dmitriy Bolotin
(74) *Attorney, Agent, or Firm* — Muncy, Geissler, Olds & Lowe, P.C.

(57) ABSTRACT

In control methods for a multi-function controller, which includes a sensor having a ring operation region, the position of an object on the sensor is detected for generating a position information, and the force applied to the sensor by the object is detected for generating a force information. When the sensor detects multiple successive position information, which indicate that the object is circling along the ring operation region, a rotation information may be generated additionally. The position information, the force information and the rotation information are used to perform operation in various functional modes.

35 Claims, 14 Drawing Sheets

(56) References Cited

U.S. PATENT DOCUMENTS

| | | | |
|---|---|---|---|
| 6,724,366 B2 * | 4/2004 | Crawford | 345/157 |
| 7,183,948 B2 * | 2/2007 | Roberts | 341/34 |
| 7,333,092 B2 | 2/2008 | Zadesky et al. | |
| 7,499,040 B2 | 3/2009 | Zadesky et al. | |
| RE40,891 E * | 9/2009 | Yasutake | 345/173 |
| 8,259,077 B2 * | 9/2012 | Shin et al. | 345/173 |
| 8,375,334 B2 | 2/2013 | Nakano et al. | |
| 2001/0035880 A1 * | 11/2001 | Musatov et al. | 345/764 |
| 2003/0001898 A1 * | 1/2003 | Bernhardson | 345/786 |
| 2003/0076306 A1 * | 4/2003 | Zadesky et al. | 345/173 |
| 2003/0135292 A1 | 7/2003 | Husgafvel et al. | |
| 2004/0263472 A1 | 12/2004 | Tachikawa | |
| 2006/0026521 A1 | 2/2006 | Hotelling et al. | |
| 2006/0026535 A1 | 2/2006 | Hotelling et al. | |
| 2006/0164403 A1 * | 7/2006 | Volckers | 345/184 |
| 2007/0013674 A1 | 1/2007 | Woolley | |
| 2007/0171190 A1 | 7/2007 | Wang | |
| 2007/0257887 A1 * | 11/2007 | Chang | 345/166 |
| 2010/0207607 A1 | 8/2010 | Katsurahira et al. | |
| 2011/0012760 A1 * | 1/2011 | Klinghult | 341/32 |
| 2011/0026202 A1 * | 2/2011 | Kai et al. | 361/679.01 |
| 2011/0109586 A1 * | 5/2011 | Rip et al. | 345/174 |
| 2011/0109587 A1 * | 5/2011 | Ferencz et al. | 345/174 |
| 2013/0147739 A1 * | 6/2013 | Åberg et al. | 345/173 |

FOREIGN PATENT DOCUMENTS

| | | |
|---|---|---|
| CN | 101782810 A | 7/2010 |
| TW | I256020 B | 6/2006 |
| TW | M303429 U | 12/2006 |

* cited by examiner

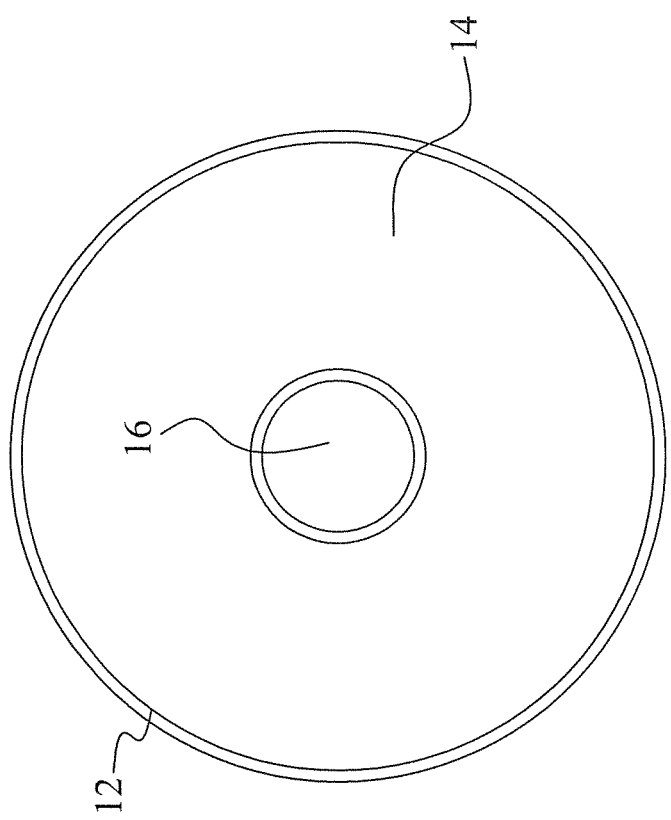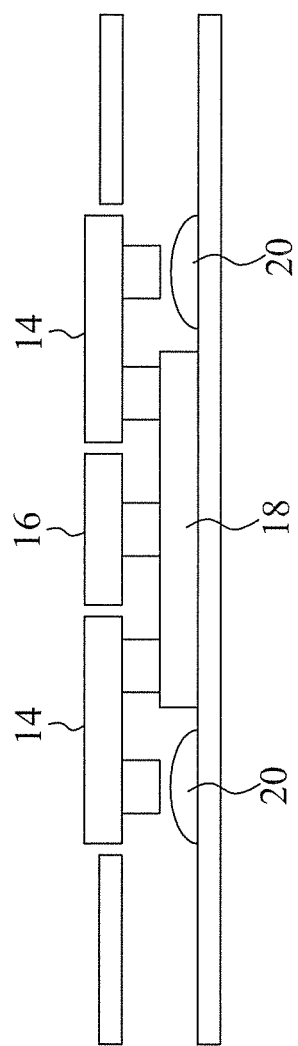
Fig. 2

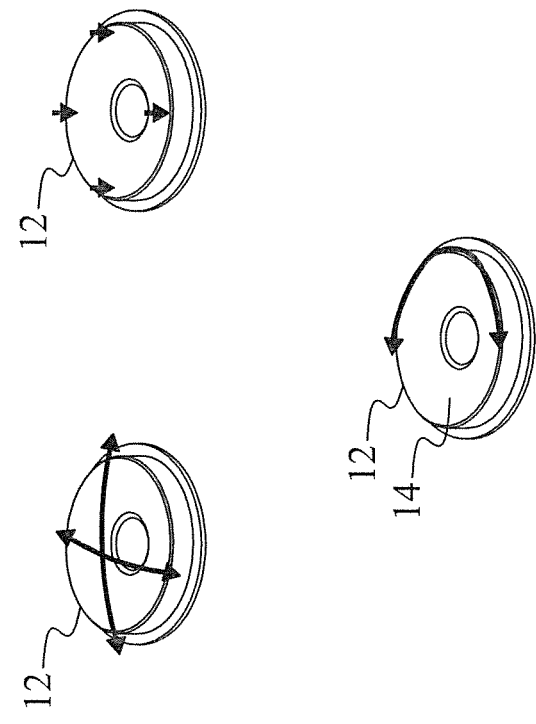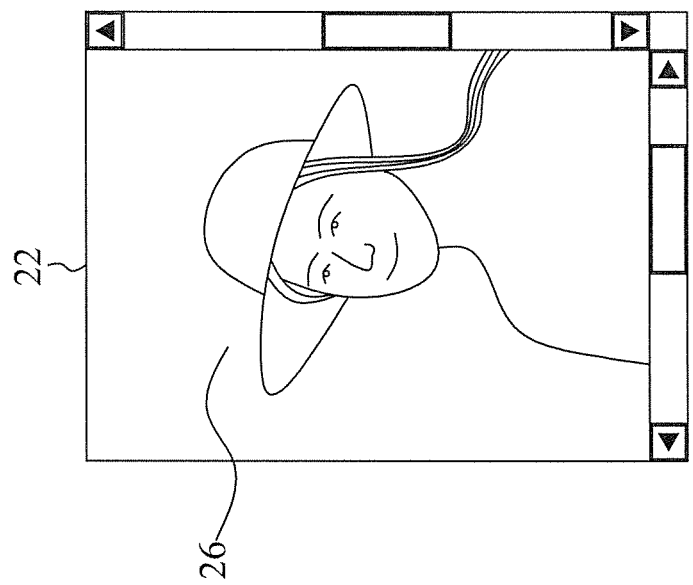
Fig. 4

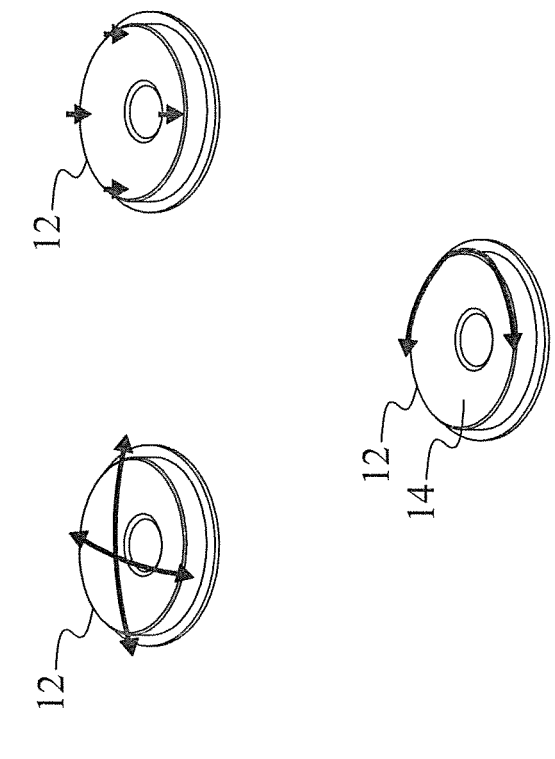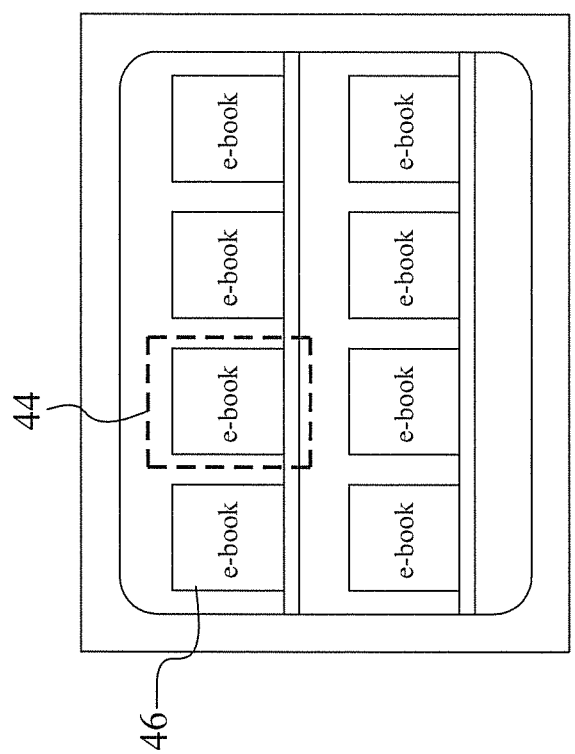
Fig. 9

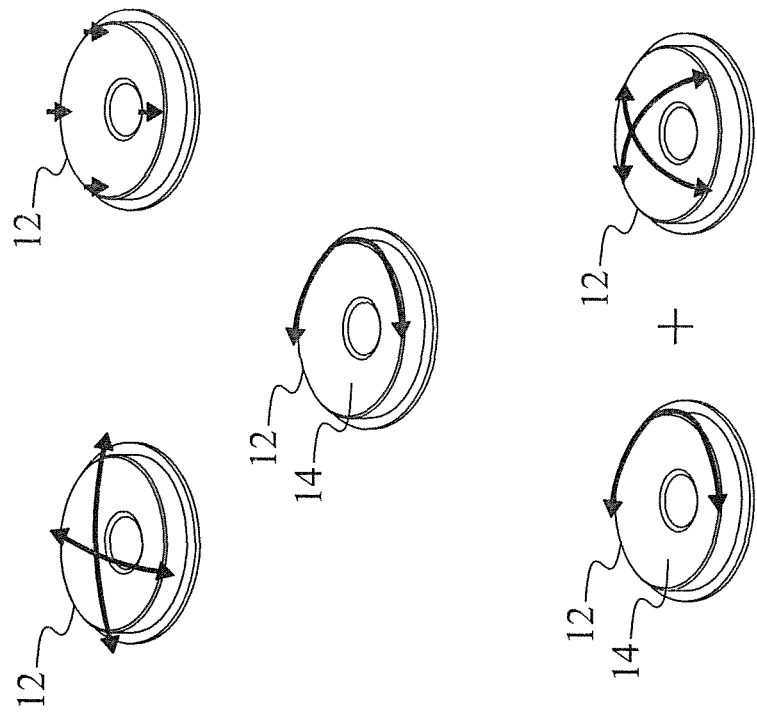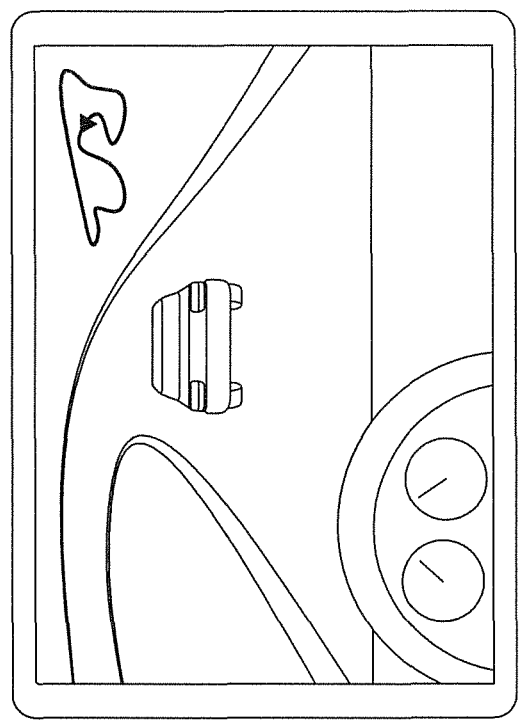
Fig. 12

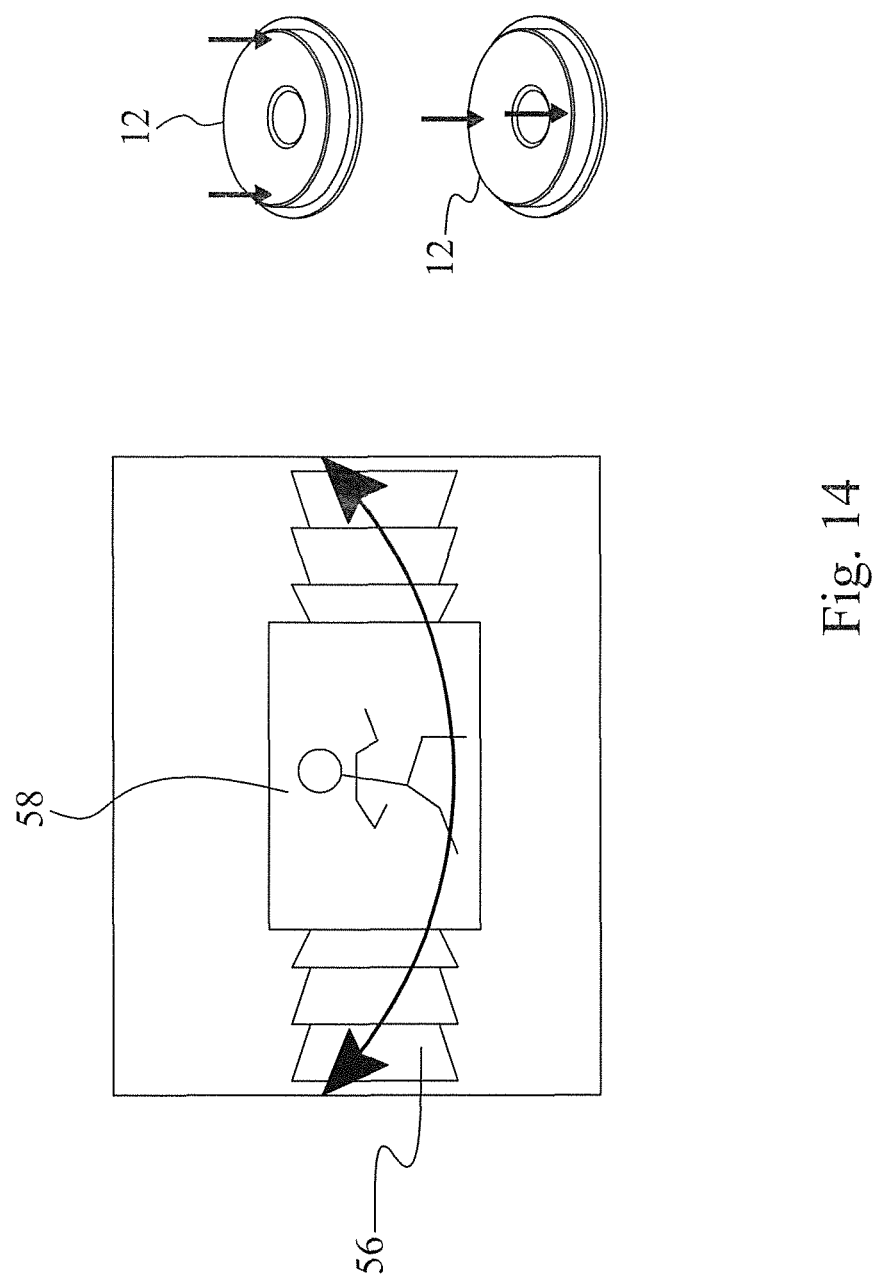

CONTROL METHODS FOR A MULTI-FUNCTION CONTROLLER

CROSS REFERENCE TO RELATED APPLICATIONS

This application claims the benefit under 35 U.S.C. section 119(e) of U.S. Provisional Application No. 61/394,423, filed on Oct. 19, 2010. This application also claims the foreign priority benefit under 35 U.S.C. section 119(a) of Taiwanese Patent Application No. 100126849, filed on Jul. 28, 2011.

FIELD OF THE INVENTION

The present invention is related generally to a controller and, more particularly, to control methods for a multi-function controller.

BACKGROUND OF THE INVENTION

As a result of highly developed technologies, many modern electric appliances are produced to provide multiple functions. While these electric appliances are convenient in some respects, they require a more complicated user interface. In this context, the present invention provides control methods for a multi-function controller, which allows a more intuitional operation.

SUMMARY OF THE INVENTION

An objective of the present invention is to provide control methods for a multi-function controller.

In a first embodiment according to the present invention, a control method for a multi-function controller, which includes a sensor having a ring operation region, detects the position of an object on the sensor to generate a position information, detects the force applied to the sensor by the object to generate a force information, enables one of a plurality of functional modes, and when a mouse mode included in the plurality of functional modes is enabled, uses the sensor to operate a mouse cursor on a display to control the direction for the mouse cursor to move according to the position information, and to control the speed for the mouse cursor to move according to the force information.

In a second embodiment according to the present invention, a control method for a multi-function controller, which includes a sensor having a ring operation region, detects the position of an object on the sensor to generate a position information, detects the force applied to the sensor by the object to generate a force information, enables one of a plurality of functional modes, and when a photo mode included in the plurality of functional modes is enabled, uses the sensor to operate a photo on a display to control the direction for the photo to move according to the position information, and to control the speed for the photo to move according to the force information.

In a third embodiment according to the present invention, a control method for a multi-function controller, which includes a sensor having a ring operation region, detects the position of an object on the sensor to generate a position information, detects the force applied to the sensor by the object to generate a force information, enables one of a plurality of functional modes, and when a map mode included in the plurality of functional modes is enabled, displays a part of a map with a window on a display and uses the sensor to operate the window to control the direction for the window to move according to the position information, and to control the speed for the window to move according to the force information.

In a fourth embodiment according to the present invention, a control method for a multi-function controller, which includes a sensor having a ring operation region, detects the position of an object on the sensor to generate a position information, detects the force applied to the sensor by the object to generate a force information, enables one of a plurality of functional modes, and when a menu mode included in the plurality of functional modes is enabled, uses the sensor to operate a select cursor on a control menu on a display to control the direction for the select cursor to move according to the position information, and to control the speed for the select cursor to move according to the force information.

In a fifth embodiment according to the present invention, a control method for a multi-function controller, which includes a sensor having a ring operation region, detects the position of an object on the sensor to generate a position information, detects the force applied to the sensor by the object to generate a force information, enables one of a plurality of functional modes, and when a read mode included in the plurality of functional modes is enabled, displays an e-book on a display and uses the sensor to operate the e-book in the way that when the position information indicates that the object is on the horizontal axis of the sensor, the e-book is turned to the previous page or the next page according to the position information, and the speed of page turning of the e-book is controlled according to the force information.

In a sixth embodiment according to the present invention, a control method for a multi-function controller, which includes a sensor having a ring operation region, detects the position of an object on the sensor to generate a position information, detects the force applied to the sensor by the object to generate a force information, enables one of a plurality of functional modes, and when a multimedia mode included in the plurality of functional modes is enabled, uses the sensor to operate a multimedia file in the way that when the position information indicates that the object is on the horizontal axis of the sensor, the multimedia file is controlled to fast forward or rewind according to the position information, with the speed of fast forwarding or rewinding according to the force information.

In a seventh embodiment according to the present invention, a control method for a multi-function controller, which includes a sensor having a ring operation region, detects the position of an object on the sensor to generate a position information, detects the force applied to the sensor by the object to generate a force information, enables one of a plurality of functional modes, and when a game mode included in the plurality of functional modes is enabled, uses the sensor to operate a game character on a display to control the direction for the game character to move according to the position information, and to control the speed for the game character to move according to the force information.

In an eighth embodiment according to the present invention, a control method for a multi-function controller, which includes a sensor having a ring operation region, detects the position of an object on the sensor to generate a position information, detects the force applied to the sensor by the object to generate a force information, enables one of a plurality of functional modes, and when a three-dimensional (3D) photo mode included in the plurality of functional modes is enabled, displays photos of a gallery on a display in a 3D manner and uses the sensor to operate the gallery in the way that when the position information indicates that the object is on the horizontal axis of the sensor, the photos are browsed in either direction according to the position information with a speed according to the force information, and when the position information indicates that the object is on the vertical axis of the sensor, the currently presented photo is zoomed in or out on according to the position information with a zooming speed according to the force information.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which:

FIG. 2 shows an exemplary structure of the sensor of FIG. 1;

FIG. 4 graphically illustrates a photo mode according to the present invention;

FIG. 9 depicts a menu of e-books before a read mode according to the present invention is enabled;

FIGS. 12 and 13 graphically illustrate a game mode according to the present invention; and FIG. 14 graphically illustrates a three-dimensional photo mode according to the present invention.

DETAILED DESCRIPTION OF THE INVENTION

Figure 1:
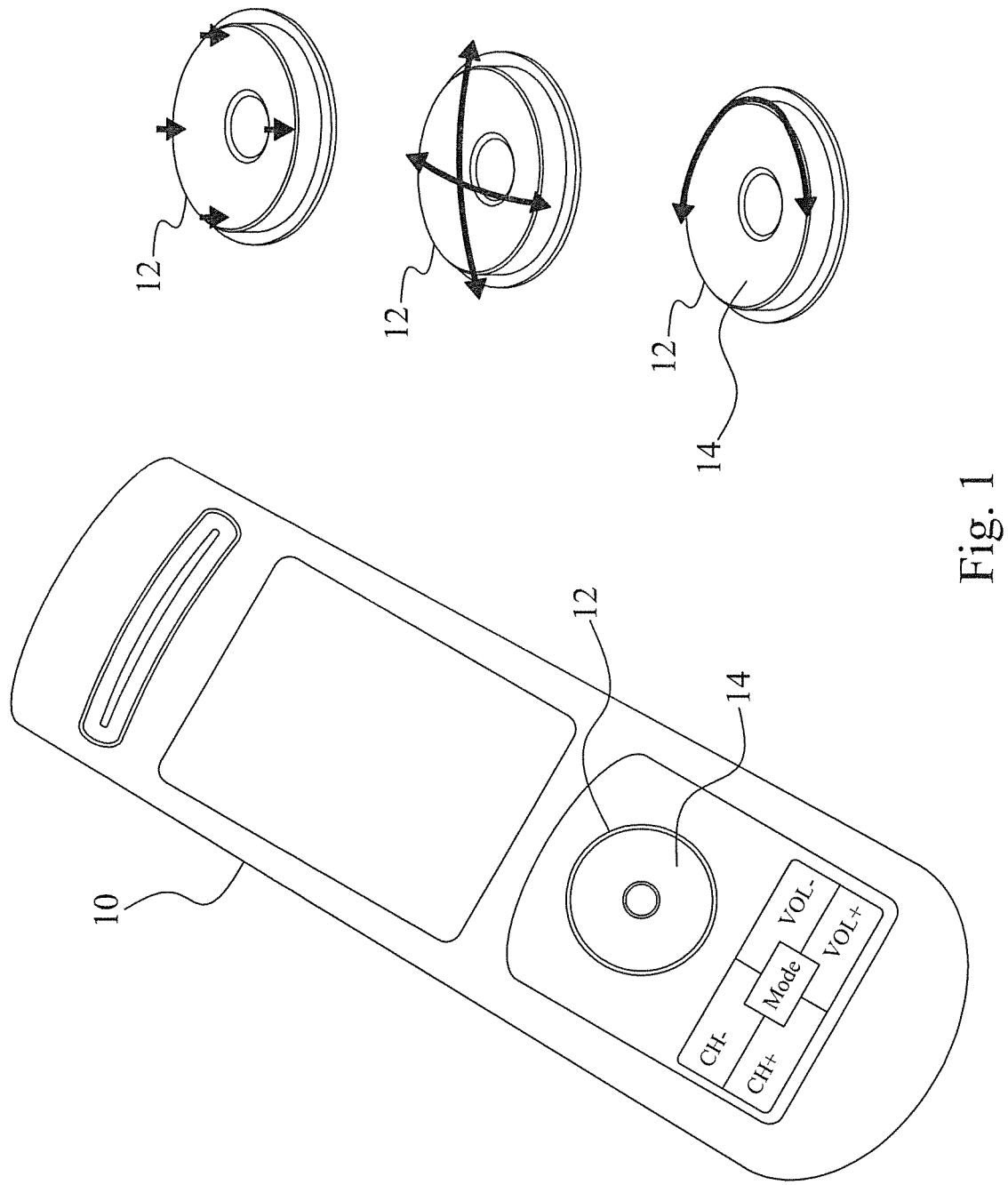
FIG. 1 shows a multi-function controller and a sensor thereof for methods according to the present invention to apply thereto.

For an example of a multi-function controller for methods according to the present invention to apply, a remote controller 10 is provided in FIG. 1, which includes a sensor 12 and other control elements such as button, keypad, keyboard and touch pad, and the sensor 12 has a ring operation region 14. When a user uses an object, his/her finger for example, to operate the sensor 12, the sensor 12 will detect the position of the object based on the center of the ring operation region 14, and accordingly generate a position information. In an embodiment, the position information expresses the position of the object in terms of angle. The sensor 12 further detects the force the object applies on the sensor 12, and accordingly generates a force information, to make the operation more intuitive. In addition, when the object moves along the ring operation region 14, the sensor 12, after receiving multiple successive position information, will obtain the information that the object is circling along the ring operation region 14 from the multiple position information, and accordingly generate a rotation information including indication of either a clockwise circling motion or an anticlockwise circling motion. In an embodiment, the rotation information contains information about the distance where the object moves along the ring operation region 14. In another embodiment, the rotation information contains information about a number of circles the object has made on the ring operation region 14. The multi-function controller 10 uses the sensor 12 to control a system, and when one of a plurality of functional modes is enabled, operates according to the position information, the force information or the rotation information to carry out particular function in each of the plurality of functional modes.

While FIG. 1 provides the handheld remote controller 10 for an example, methods according to the present invention may be applied to the user interface of cell phone, navigator, MP3, MP4, MP5, digital standstill camera, digital video camera, electronic reader, game joystick, etc. In this case, a multi-function controller may use the sensor 12 for more complicated control and operation, to thereby downsize the user interface and, in turn, downsize the overall handheld device.

FIG. 2 shows an exemplary structure of the sensor 12, in which the upper part is a top view and the lower part is a cross-sectional view of the sensor 12. In this case, a button 16 is arranged at the center of the ring operation region 14, a force detect pad 18 is provided below the ring operation region 14 and the button 16 for detecting the force applied to the sensor 12 by the object to generate the force information, and for detecting the position where the ring operation region 14 is pressed to generate the position information. Additionally, a switch 20 is arranged around the force detect pad 18 to give a click sensation to the finger pressing the ring operation region 14, or to switch between or enable the plurality of functional modes. In an embodiment, the button 16 is used to trigger a menu of the plurality of functional modes, and the ring operation region 14 is used to select one of the plurality of functional modes from the menu. In an embodiment, the sensor 12 may be implemented by a capacitive, resistive or other type touch sensor.

Figure 3:
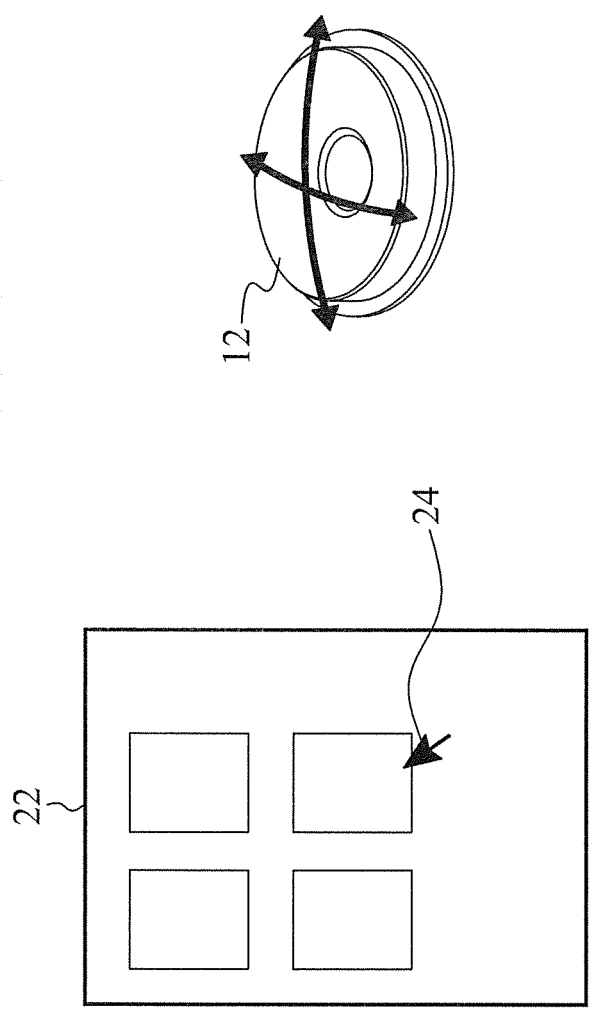
FIG. 3 graphically illustrates a mouse mode according to the present invention.

FIG. 3 graphically illustrates a mouse mode according to the present invention. When the mouse mode included in the plurality of functional modes is enabled, the sensor 12 can be used to operate a cursor 24 in a screen 22 to control the direction for the cursor 24 to move according to the position information, and to control the speed for the cursor 24 to move according to the force information.

FIG. 4 graphically illustrates a photo mode according to the present invention. When the photo mode included in the plurality of functional modes is enabled, the sensor 12 can be used to operate a photo 26 in a screen 22 to control the direction for the photo 26 to move according to the position information, and to control the speed for the photo 26 to move according to the force information. In addition, when the sensor 12 detects multiple successive position information indicating that the object is circling along the ring operation region 14, a rotation information is generated to control to zoom in or out the photo 26.

Figure 5:
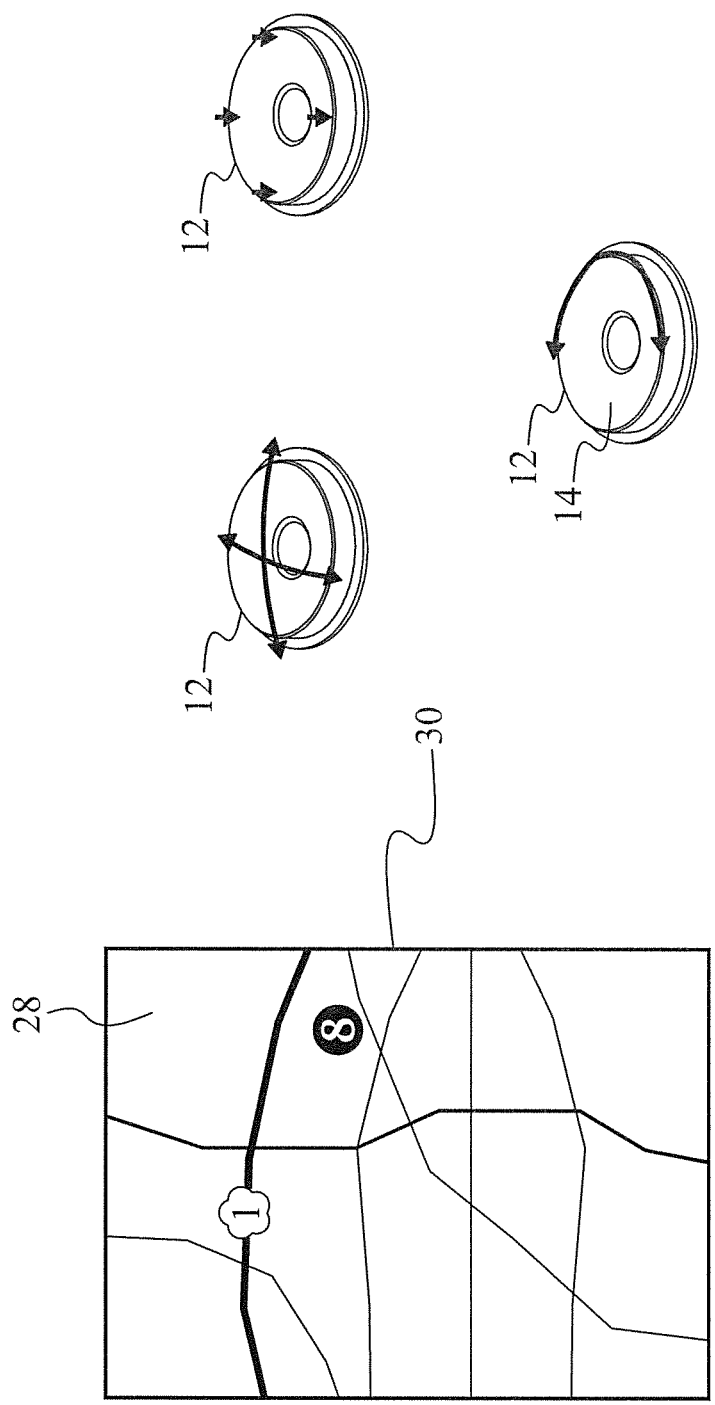
FIG. 5 graphically illustrates a map mode according to the present invention.

FIG. 5 graphically illustrates a map mode according to the present invention. When the map mode included in the plurality of functional modes is enabled, a part of a map 28 is displayed in a window 30, and the sensor 12 may be used to operate the window 30, to control the direction for the window 30 to move according to the position information, and to control the speed for the window 30 to move according to the force information. When the sensor 12 detects multiple successive position information indicating that the object is circling along the ring operation region 14, a rotation information is generated to control to zoom in or out the map 28. In an embodiment, the window 30 is preset to match the display in size. In an embodiment, the map 28 is displayed in 3D manner.

Figure 6:
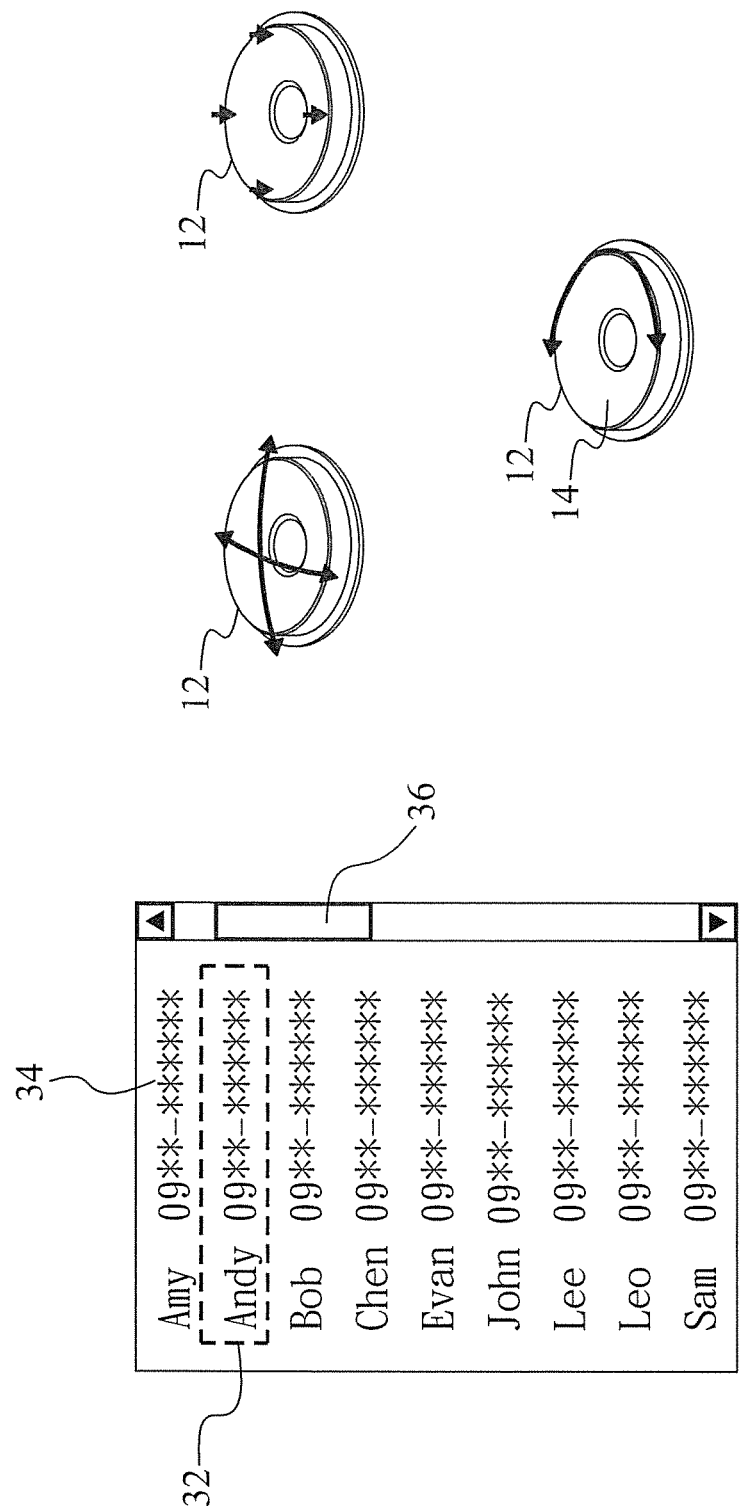
FIGS. 6-8 graphically illustrate a menu mode according to the present invention.
Figure 7:
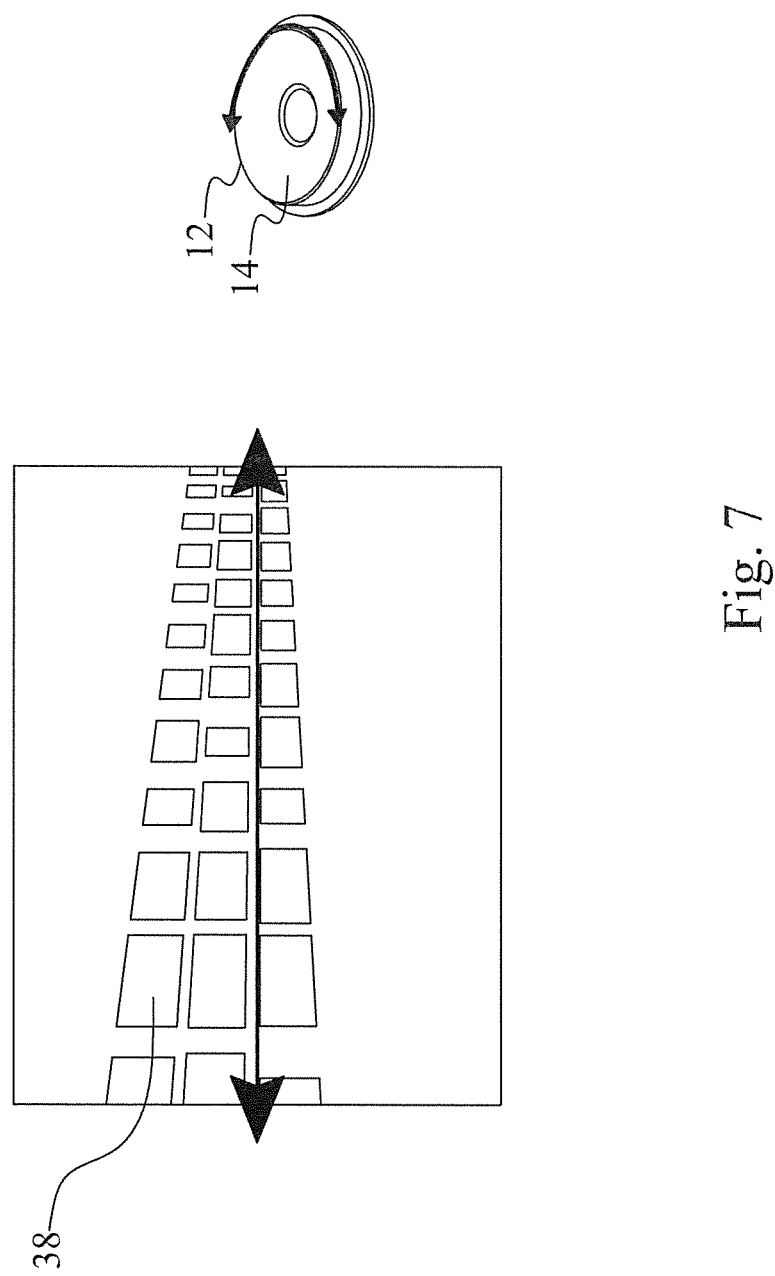
Figure 8:
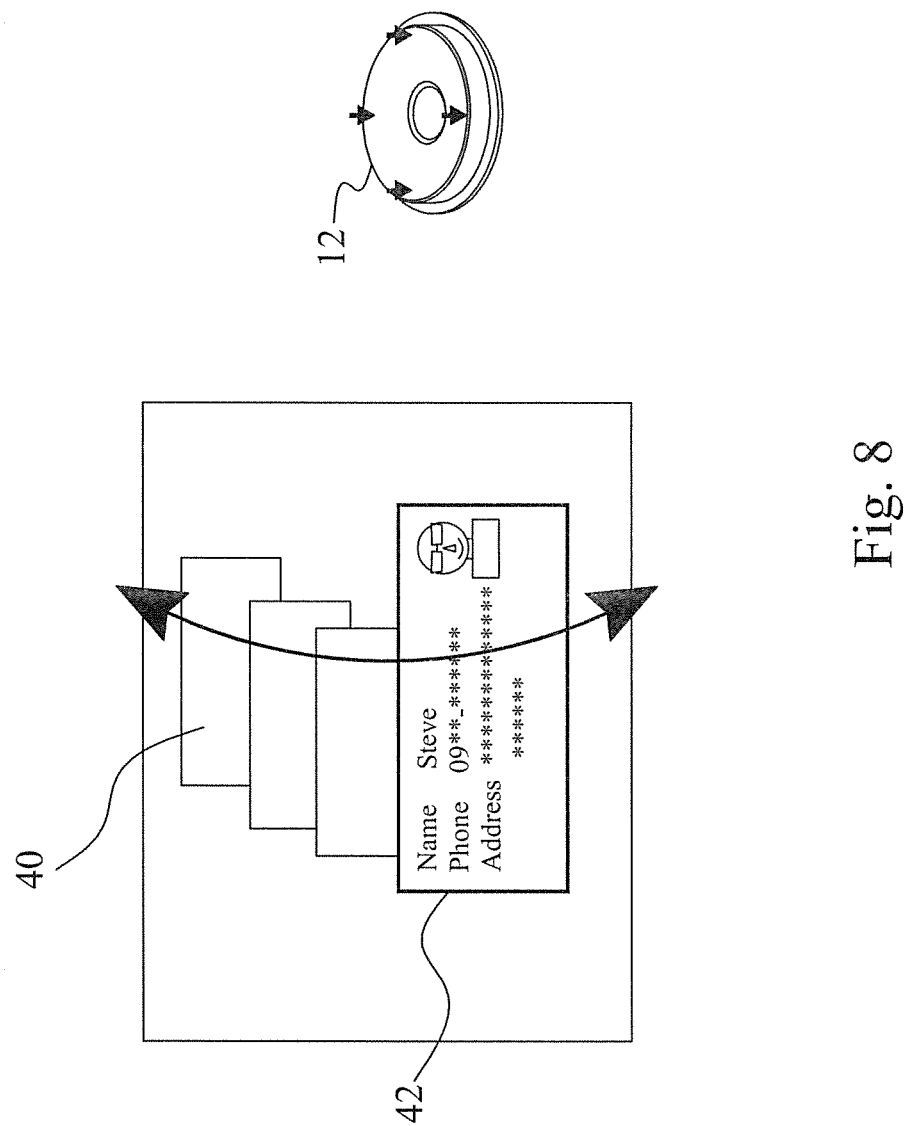

FIG. 6 graphically illustrates a menu mode according to the present invention. When the menu mode included in the plurality of functional modes is enabled, a select cursor 32 is displayed on a menu 34, and the sensor 12 may be used to operate the select cursor 32, to control the direction for the select cursor 32 to move according to the position information, and to control the speed for the select cursor 32 to move according to the force information. When the sensor 12 detects multiple successive position information indicating that the object is circling along the ring operation region 14, a rotation information is generate to control fast forwarding or rewinding of the menu 34, the same as by scrolling a scroll bar 36. The menu mode may be displayed in various ways. For example, FIG. 7 shows a menu 38 having a perspective effect. Alternatively, as shown in FIG. 8, the menu is a cycle menu 40 having a perspective effect, and when the select cursor 42 is deposited on one of options in the menu 40, details of this option are displayed.

Figure 10:
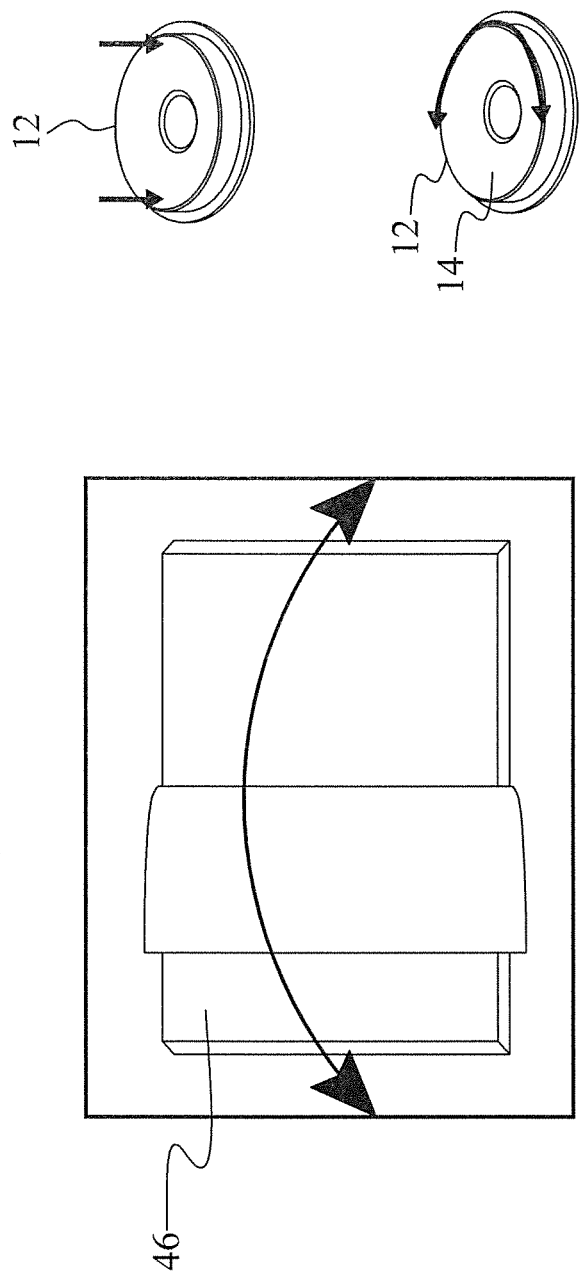
FIG. 10 graphically illustrates a read mode according to the present invention.

FIG. 9 depicts a menu of e-books before a read mode according to the present invention is enabled, in which a showcase is displayed for a plurality of e-books 46, and a select cursor 44 is used to choose any of the e-books 46. After a selection is made to the e-books 46, the read mode included in the plurality of functional modes is enabled. FIG. 10 illustrates how it works in the read mode. The screen now displays the selected e-book 46, and the sensor 12 is used to operate the e-book 46. When the position information indicates that the object is on the horizontal axis of the sensor 12, the e-book 46 is turned to the previous page or the next page according to the position information. Moreover, the force applied to the sensor 12 by the object is detected to generate a force information to control the speed of page turning of the e-book 46. When the sensor 12 detects multiple successive position information indicating that the object is circling along the ring operation region 14, a rotation information is generated to control to zoom in or out the e-book 46.

Figure 11:
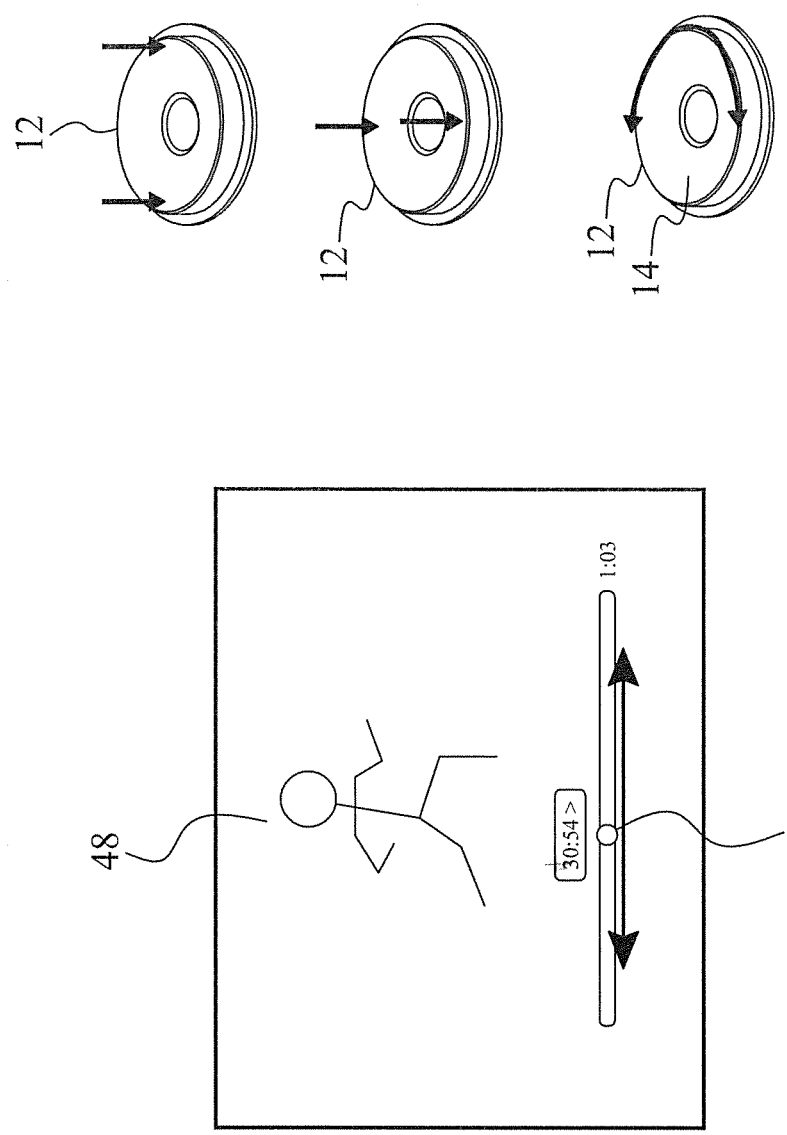
FIG. 11 graphically illustrates a multimedia mode according to the present invention.

FIG. 11 graphically illustrates a multimedia mode according to the present invention. When the multimedia mode included in the plurality of functional modes is enabled, the sensor 12 may be used to operate a multimedia file 48 that may contain contents of music and video. When the position information indicates that the object is on the horizontal axis of the sensor 12, the multimedia file 48 is rewound or fast-forwarded according to the position information with a speed according to the force information. When the object is detected on the vertical axis of the sensor 12, the multimedia file 48 is paused or stopped according to the position information. In another embodiment, when the sensor 12 detects multiple successive position information indicating that the object is circling along the ring operation region 14, a rotation information is generated to control moving of a playing time pointer 50.

Figure 13:
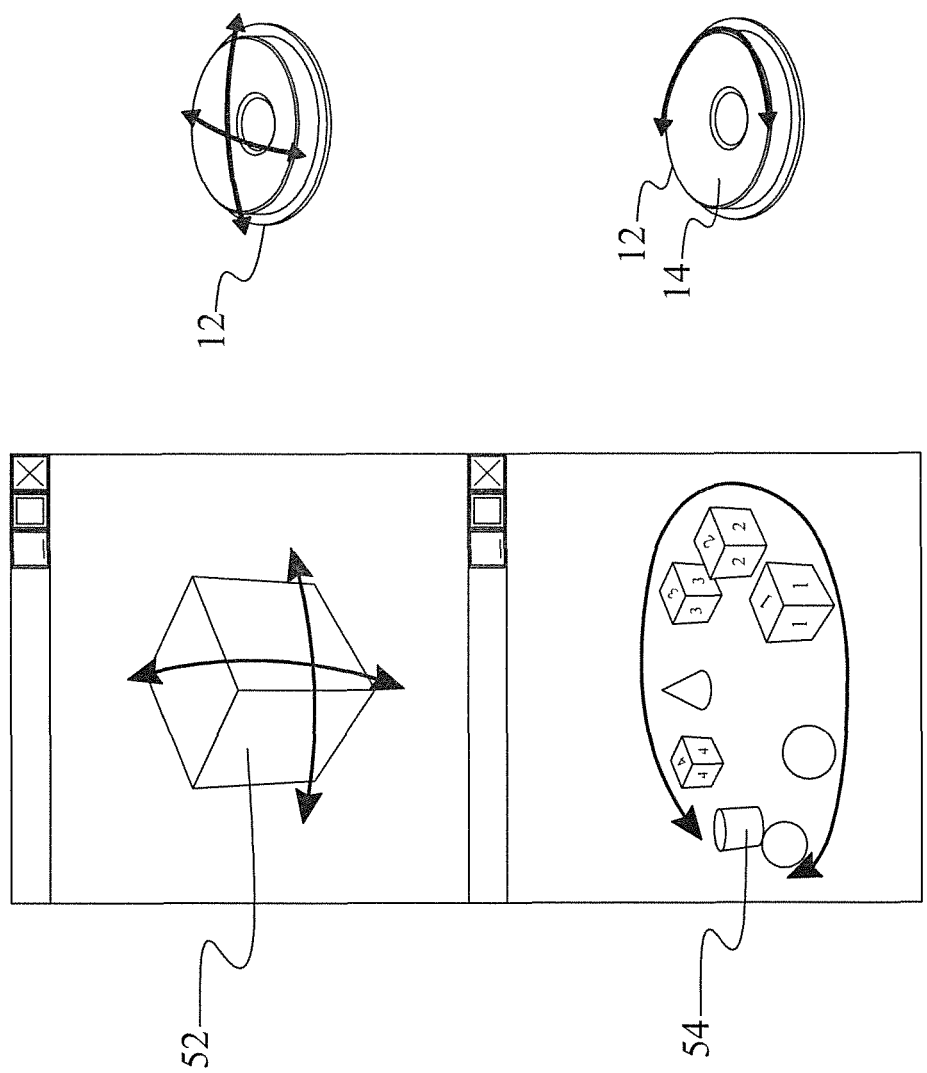

FIGS. 12 and 13 graphically illustrate a game mode according to the present invention. When the game mode included in the plurality of functional modes is enabled, the sensor 12 may be used to operate a game character by using the position information to control the direction for the game character to move and using the force information to control the speed for the game character to move. For example, referring to FIG. 12, in a car racing game, a user takes a first-person view to play the game, and in this case, the game character is a racing car under control. The position information determines the driving direction and the force information determines how far the gas pedal is depressed, i.e. the driving speed. Nowadays, games are developed with sophisticated details, and many of the games have 3D game characters. For these games, the sensor 12 allows a more intuitive operation. For instance, the cube 52 shown in FIG. 13 may have its rotation associated with the position information, and the building block 54 can be turned in all directions according to the rotation information, while the force information dominates how fast the controlled article is rotated or turned. In an embodiment, the position information is expressed in terms of angle.

FIG. 14 graphically illustrates a 3D photo mode according to the present invention. When the 3D photo mode included in the plurality of functional modes is enabled, photos 58 in a gallery 56 are displayed, and the sensor 12 can be used to operate the gallery. When the position information indicates that the object is on the horizontal axis of the sensor 12, the gallery 56 presents the photos in either direction according to the position information with a speed according to the force information. When the object is on the vertical axis of the sensor 12, the currently presented photo 58 is zoomed in or out according to the position information with a speed according to the force information.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control method for a multi-function controller including a sensor having a ring operation region, the control method comprising the steps of:
   detecting a position of an object on the sensor for generating a position information;
   detecting a force applied to the sensor by the object for generating a force information;
   enabling one of a plurality of functional modes;
   operating a mouse cursor responsive to operation on the sensor when a mouse mode included in the plurality of functional modes is enabled, wherein the mouse cursor is controlled to move in a direction according to the position information with a speed according to the force information; and
   operating a game character responsive to operation on the sensor when a game mode included in the plurality of functional modes is enabled, wherein the game character is controlled to move in a direction according to the position information with a speed according to the force information.

2. The control method of claim 1, further comprising the step of operating a photo responsive to operation on the sensor when a photo mode included in the plurality of functional modes is enabled, wherein the photo is controlled to move in a direction according to the position information with a speed according to the force information.

3. The control method of claim 2, further comprising the steps of:
   in the photo mode, generating a rotation information responsive to the sensor detecting multiple successive position information which indicate that the object is circling along the ring operation region; and
   zooming in or out the photo according to the rotation information.

4. The control method of claim 1, further comprising the step of displaying a part of a map with a window and operating the window responsive to operation on the sensor when a map mode included in the functional modes is enabled, wherein the window is controlled to move in a direction according to the position information with a speed according to the force information.

5. The control method of claim 4, further comprising the steps of:

in the map mode, generating a rotation information responsive to the sensor detecting multiple successive position information which indicate that the object is circling along the ring operation region; and zooming in or out the map according to the rotation information.

6. The control method of claim 4, wherein the step of displaying a part of a map with a window comprises the step of displaying the part of the map in a three-dimensional manner.

7. The control method of claim 1, further comprising the step of displaying a select cursor on a control menu and operating the select cursor responsive to operation on the sensor when a menu mode included in the plurality of functional modes is enabled, wherein the select cursor is controlled to move in a direction according to the position information with a speed according to the force information.

8. The control method of claim 7, further comprising the steps of:

in the menu mode, generating a rotation information responsive to the sensor detecting multiple successive position information which indicate that the object is circling along the ring operation region; and page turning the control menu in either direction according to the rotation information.

9. The control method of claim 7, further comprising the step of displaying the control menu in a three-dimensional manner in the menu mode.

10. The control method of claim 7, further comprising the step of displaying the control menu cyclically in the menu mode.

11. The control method of claim 7, further comprising the step of displaying details of an option of the control menu responsive to the select cursor deposited on the control menu in the menu mode.

12. The control method of claim 1, further comprising the step of displaying an e-book and operating the e-book responsive to operation on the sensor when a read mode included in the plurality of functional modes is enabled, wherein the e-book is page turned responsive to the position information indicating that the object is on a horizontal axis of the sensor, in either direction according to the position information with a speed according to the force information.

13. The control method of claim 12, further comprising the steps of:

in the read mode, generating a rotation information responsive to the sensor detecting multiple successive position information which indicate that the object is circling along the ring operation region; and zooming in or out the e-book according to the rotation information.

14. The control method of claim 1, further comprising the step of operating a multimedia file responsive to operation on the sensor when a multimedia mode included in the plurality of functional modes is enabled, wherein the multimedia file is controlled to fast forward or rewind according to the position information responsive to the position information indicating that the object is on a horizontal axis of the sensor, with a speed of fast forwarding or rewinding according to the force information.

15. The control method of claim 14, further comprising the step of pausing or stopping the multimedia file from playing according to the position information responsive to the position information indicating that the object is on a vertical axis of the sensor.

16. The control method of claim 14, further comprising the steps of:

in the multimedia mode, generating a rotation information responsive to the sensor detecting multiple successive position information which indicate that the object is circling along the ring operation region; and controlling a playtime point of the multimedia file according to the rotation information.

17. The control method of claim 1, further comprising the step of expressing the position information in terms of angle.

18. The control method of claim 1, further comprising the step of displaying photos of a gallery in a three-dimensional manner and operating the gallery responsive to operation on the sensor when a three-dimensional photo mode included in the plurality of functional modes is enabled, wherein the photos are browsed responsive to the position information indicating that the object is on a horizontal axis of the sensor, in either direction according to the position information with a speed according to the force information, and a currently presented photo is zoomed in or out responsive to the position information indicating that the object is on a vertical axis of the sensor, with a zooming speed according to the force information.

19. A control method for a multi-function controller including a sensor having a ring operation region, the control method comprising the steps of:

detecting a position of an object on the sensor for generating a position information;

detecting a force applied to the sensor by the object for generating a force information;

enabling one of a plurality of functional modes; and operating a photo responsive to operation on the sensor when a photo mode included in the plurality of functional modes is enabled, wherein the photo is controlled to move in a direction according to the position information with a speed according to the force information.

20. The control method of claim 19, further comprising the steps of:

in the photo mode, generating a rotation information responsive to the sensor detecting multiple successive position information which indicate that the object is circling along the ring operation region; and zooming in or out the photo according to the rotation information.

21. A control method for a multi-function controller including a sensor having a ring operation region, the control method comprising the steps of:

detecting a position of an object on the sensor for generating a position information;

detecting a force applied to the sensor by the object for generating a force information;

enabling one of a plurality of functional modes; and displaying a part of a map with a window and operating the window responsive to operation on the sensor when a map mode included in the functional modes is enabled, wherein the window is controlled to move in a direction according to the position information with a speed according to the force information.

22. The control method of claim 21, further comprising the steps of:

in the map mode, generating a rotation information responsive to the sensor detecting multiple successive position information which indicate that the object is circling along the ring operation region; and zooming in or out the map according to the rotation information.

23. The control method of claim 21, wherein the step of displaying a part of a map with a window comprises the step of displaying the part of the map in a three-dimensional manner.

24. A control method for a multi-function controller including a sensor having a ring operation region, the control method comprising the steps of:
- detecting a position of an object on the sensor for generating a position information;
- detecting a force applied to the sensor by the object for generating a force information;
- enabling one of a plurality of functional modes; and
- displaying a select cursor on a control menu and operating the select cursor responsive to operation on the sensor when a menu mode included in the plurality of functional modes is enabled, wherein the select cursor is controlled to move in a direction according to the position information with a speed according to the force information.

25. The control method of claim 24, further comprising the steps of:
- in the menu mode, generating a rotation information responsive to the sensor detecting multiple successive position information which indicate that the object is circling along the ring operation region; and
- page turning the control menu in either direction according to the rotation information.

26. The control method of claim 24, further comprising the step of displaying the control menu in a three-dimensional manner in the menu mode.

27. The control method of claim 24, further comprising the step of displaying the control menu cyclically in the menu mode.

28. The control method of claim 24, further comprising the step of displaying details of an option of the control menu responsive to the select cursor deposited on the control menu in the menu mode.

29. A control method for a multi-function controller including a sensor having a ring operation region, the control method comprising the steps of:
- detecting a position of an object on the sensor for generating a position information;
- detecting a force applied to the sensor by the object for generating a force information;
- enabling one of a plurality of functional modes; and
- displaying an e-book and operating the e-book responsive to operation on the sensor when a read mode included in the plurality of functional modes is enabled, wherein the e-book is page turned responsive to the position information indicating that the object is on a horizontal axis of the sensor, in either direction according to the position information with a speed according to the force information; and
- in the read mode, generating a rotation information responsive to the sensor detecting multiple successive position information which indicate that the object is circling along the ring operation region; and zooming in or out the e-book according to the rotation information.

30. A control method for a multi-function controller including a sensor having a ring operation region, the control method comprising the steps of:
- detecting a position of an object on the sensor for generating a position information;
- detecting a force applied to the sensor by the object for generating a force information;
- enabling one of a plurality of functional modes; and
- operating a multimedia file responsive to operation on the sensor when a multimedia mode included in the plurality of functional modes is enabled, wherein the multimedia file is controlled to fast forward or rewind according to the position information responsive to the position information indicating that the object is on a horizontal axis of the sensor, with a speed of fast forwarding or rewinding according to the force information.

31. The control method of claim 30, further comprising the step of pausing or stopping the multimedia file from playing according to the position information responsive to the position information indicating that the object is on a vertical axis of the sensor in the multimedia mode.

32. The control method of claim 30, further comprising the steps of:
- in the multimedia mode, generating a rotation information responsive to the sensor detecting multiple successive position information which indicate that the object is circling along the ring operation region; and
- controlling a playtime point of the multimedia file according to the rotation information.

33. A control method for a multi-function controller including a sensor having a ring operation region, the control method comprising the steps of:
- detecting a position of an object on the sensor for generating a position information;
- detecting a force applied to the sensor by the object for generating a force information;
- enabling one of a plurality of functional modes; and
- operating a game character responsive to operation on the sensor when a game mode included in the plurality of functional modes is enabled, wherein the game character is controlled to move in a direction according to the position information with a speed according to the force information.

34. The control method of claim 33, further comprising the step of expressing the position information in terms of angle.

35. A control method for a multi-function controller including a sensor having a ring operation region, the control method comprising the steps of:
- detecting a position of an object on the sensor for generating a position information;
- detecting a force applied to the sensor by the object for generating a force information;
- enabling one of a plurality of functional modes; and
- displaying photos of a gallery in a three-dimensional manner and operating the gallery responsive to operation on the sensor when a three-dimensional photo mode included in the plurality of functional modes is enabled, wherein the photos are browsed responsive to the position information indicating that the object is on a horizontal axis of the sensor, in either direction according to the position information with a speed according to the force information, and a currently presented photo is zoomed in or out responsive to the position information indicating that the object is on a vertical axis of the sensor, with a zooming speed according to the force information.

* * * * *